United States Patent
Kim et al.

(10) Patent No.: US 8,334,930 B2
(45) Date of Patent: Dec. 18, 2012

(54) IMAGE DISPLAY APPARATUS AND METHOD OF COMPENSATING FOR WHITE BALANCE

(75) Inventors: Kang Soo Kim, Gumi-si (KR); Sung Young Lee, Gumi-si (KR)

(73) Assignee: LG Electronics Inc., Seoul (KR)

( * ) Notice: Subject to any disclaimer, the term of this patent is extended or adjusted under 35 U.S.C. 154(b) by 212 days.

(21) Appl. No.: 12/681,169

(22) PCT Filed: Oct. 2, 2008

(86) PCT No.: PCT/KR2008/005823
§ 371 (c)(1),
(2), (4) Date: Jul. 26, 2010

(87) PCT Pub. No.: WO2009/045068
PCT Pub. Date: Apr. 9, 2009

(65) Prior Publication Data
US 2010/0289962 A1 Nov. 18, 2010

(30) Foreign Application Priority Data

Oct. 2, 2007 (KR) .................. 10-2007-0099225
Oct. 24, 2007 (KR) .................. 10-2007-0107342

(51) Int. Cl.
*H04N 9/73* (2006.01)
(52) U.S. Cl. ...................................... 348/658
(58) Field of Classification Search .......... 348/655–658, 348/602, 603
See application file for complete search history.

(56) References Cited

U.S. PATENT DOCUMENTS

| 5,870,069 A | 2/1999 | Choh et al. ............... 345/22 |
| 6,292,228 B1 * | 9/2001 | Cho ............................ 348/603 |
| 6,770,861 B2 * | 8/2004 | Hagihara .................. 250/208.1 |

FOREIGN PATENT DOCUMENTS

| GB | 2 341 033 A | 3/2000 |
| JP | 11-069370 A | 3/1999 |
| JP | 11-355797 A | 12/1999 |
| KR | 10-2007-0028022 A | 3/2007 |

OTHER PUBLICATIONS

PCT International Search Report and Written Opinion dated Apr. 20, 2010 for Applicatin No. PCT/KR2008/005823.

* cited by examiner

*Primary Examiner* — Michael Lee
(74) *Attorney, Agent, or Firm* — KED & Associates LLP

(57) ABSTRACT

An image display apparatus and a method of compensating for white balance are disclosed. The method of compensating for white balance of an image display apparatus includes reading a picture status mode (PSM) set in the image display apparatus, measuring the light amounts of RGB color signals from an external light source of the image display apparatus and detecting a color temperature of the external light source, calculating a difference between the detected color temperature of the external light source and a color temperature of the white balance of the set PSM, performing white balance gain compensation for correcting the color temperature of an input image according to the PSM using the calculated difference between the color temperatures, and displaying an image of which the white balance gain is compensated for. Accordingly, it is possible to correct a difference between color temperatures according to a PSM of an input image and an external light source in TV viewing conditions of various environments and maintain sharp white balance of an output image.

18 Claims, 8 Drawing Sheets

FIG. 6

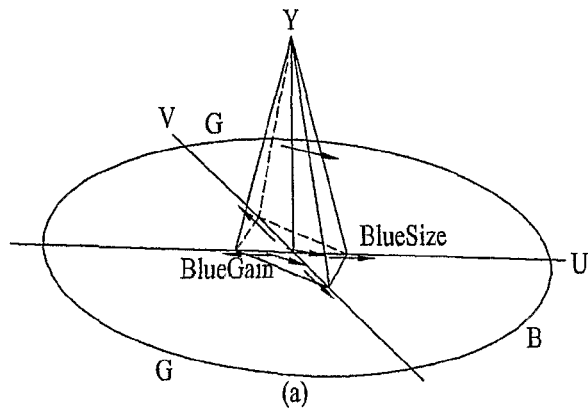

(a)

Setting of coefficient according to PSM

| | Picture Mode_1 | Picture Mode_2 | Picture_Mode3 | User | |
|---|---|---|---|---|---|
| Y min | Application from intermediate gray scale | Application from gray scale higher than dynamic | Don't USE | Reference: See dynamic min value | Increase of step => reduce Ymin region |
| Y_MAX | Application up to maximum portion | Application up to maximum portion | | Reference: See dynamic max value | Fixed |
| Y_fade | Set small threshold section to min value | Set section by region wider than dynamic | | Reference: See dynamic fade value | Fixed |
| Saturation_Max | Set region on the basis of original point of uv domain | Set section by region narrower than dynamic | | Reference: See dynamic Saturation saturation max | Increase of step =>reduce saturation max value |
| Saturation_Min | Set region by value smaller than max on the basis of original point of uv domain | Set section by region narrower than dynamic | | Reference: See dynamic saturation min | Increase of step =>reduce saturation min value |
| Saturation_fade | Set threshold section in region wider than saturation min/max | Set threshold section in region wider than dynamic | | Reference: See dynamic saturation fade | Fixed |

(b)

IMAGE DISPLAY APPARATUS AND METHOD OF COMPENSATING FOR WHITE BALANCE

TECHNICAL FIELD

The present invention relates to a display apparatus, and more particularly, to an apparatus and method for compensating for white balance according to a picture status mode (PSM) and a peripheral light source.

BACKGROUND ART

Generally, a display apparatus displays an image signal having a predetermined format, which is transmitted from a video card mounted therein, on a screen by a series of signal processes such as digital sampling and scaling. From the starting of a small-sized display apparatus using a cathode ray tube, recently, a digital display apparatus using a liquid crystal display (LCD) has come into wide use as a flat panel display apparatus suitable for a large-sized display apparatus.

In such a display apparatus, display values such as contrast, color concentration, hue and sharpness vary according to various image genres.

For example, an image is displayed to be dynamically moved in a fighting scene of a drama and an image is displayed to cause a feeling of fear in a horror movie.

An algorithm for varying a brightness level according to a picture status mode (PSM) and compensating for a sharp white color is required.

The eyes of a person have adaptation ability in the recognition of the color of a reflector even when an illuminator is changed. However, since a pickup tube of a TV camera does not have the adaptation ability, a device for compensating for the adaptation ability is required. An optical filter having an energy spectrum distribution of C illumination or D65 illumination which is a reference for applying the consistency of the hue of an object regardless of background illumination, for example, natural illumination, C illumination or D65 illumination is attached to the front side of a camera or a RGB gain is adjusted such that a white color coordinate becomes equal to the color coordinate of the reference illumination, thereby processing an image signal.

Since the color reproduction property of a conventional television (TV) receiver or monitor is based on the white color, a color space which is reproduced with respect to the same image signal is changed when the white coordinate which is the reference coordinate is changed. Since the white color of an actual TV receiver or monitor does not consider a peripheral light source, the color reproduction characteristic is gradually changed due to the peripheral light source.

DISCLOSURE

Technical Problem

An object of the present invention devised to solve the problem lies on an image display apparatus for correcting a difference between color temperatures according to a picture status mode (PSM) of an input image and an external light source in TV viewing conditions of various environments and maintaining sharp white balance of an output image, and a method of compensating for the white balance.

Technical Solution

The object of the present invention can be achieved by providing an image display apparatus including: an image signal input unit receiving an input image signal; a picture status mode (PSM) setting unit setting the PSM of the received image; a RGB color sensor measuring the light amounts of RGB color signals from an external light source and detecting a color temperature of the external light source; a color temperature calculating unit calculating a difference between the detected color temperature of the external light source and a color temperature of white balance of the set PSM; a memory storing a color temperature compensation value according to the PSM corresponding to the calculated difference in a lookup table; a gain compensating unit correcting the color temperature of the input image using the stored compensation value; and a display unit outputting the input image of which the color temperature is compensated for.

The memory may store color temperatures of sections of a fade region and a gain region of the white balance according to the set PSM in the lookup table.

The memory may further store a color temperature of a high-luminance section according to the set PSM.

The memory may store section setting values of the fade region and the gain region of the white balance.

The color temperature compensation values stored in the memory may include thresholds of a transition section, an application section and a high-luminance section of the white balance according to the PSM.

The RGB color sensor may detect the color temperature of the external light source using a color matching function.

The RGB color sensor may include a digital sensor including a filter having a spectral sensitivity characteristic.

The PSM setting unit may set any one of a comfortable image, a sharp image, a soft image and a user image mode with respect to the input image.

The PSM setting unit may set the PSM by an input signal selected by a user.

The PSM setting unit may automatically set the PSM by image information detected from the input image signal.

In another aspect of the present invention, provided herein is a method of compensating for white balance of an image display apparatus, the method including: reading a picture status mode (PSM) set in the image display apparatus; measuring the light amounts of RGB color signals from an external light source of the image display apparatus and detecting a color temperature of the external light source; calculating a difference between the detected color temperature of the external light source and a color temperature of the white balance of the set PSM; performing white balance gain compensation for correcting the color temperature of an input image according to the PSM using the calculated difference between the color temperatures; and displaying an image of which the white balance gain is compensated for.

The performing of the white balance gain compensation may include correcting Cb and Cr gain values of the input image.

The PSM set in the image display apparatus may be any one of a comfortable image, a sharp image, a soft image and a user image mode.

The PSM may be set on the basis of an input signal selected by a user.

The PSM may be automatically set by image information detected from the input image.

The performing of the white balance gain compensation may use a lookup table in which color temperature compensation values according to the PSM corresponding to the calculated difference between the color temperatures are mapped.

In another aspect of the present invention, provided herein is a method of compensating for white balance of an image display apparatus, the method including: reading a picture status mode (PSM) set in the image display apparatus; detecting a white region-based color temperature on the basis of a luminance level of an input signal according to the PSM; measuring the light amounts of RGB color signals from an external light source of the image display apparatus and detecting a color temperature of the external light source; calculating a difference between the detected color temperature of the external light source and a white region-based color temperature according to the set PSM; correcting the white region-based color temperature of the input image according to the PSM using the calculated difference between the color temperatures; and displaying an image of which the white region-based color temperature according to the PSM is compensated for.

The white region according to the luminance level of the input image may be divided into a transition section, an application section and a high-luminance section of the luminance on the basis of the set PSM.

The performing of the white balance gain compensation may include correcting Cb and Cr gain values of the input image.

The PSM set in the image display apparatus may be any one of a comfortable image, a sharp image, a soft image and a user image mode.

The PSM may be set on the basis of an input signal selected by a user.

The PSM may be automatically set by image information detected from the input image.

The performing of the white balance gain compensation may use a lookup table in which color temperature compensation values according to the PSM corresponding to the calculated difference between the color temperatures are set.

Advantageous Effects

According to the present invention, it is possible to correct a difference between color temperatures according to a picture status mode (PSM) of an input image and an external light source in TV viewing conditions of various environments and maintain sharp white balance of an output image.

DESCRIPTION OF DRAWINGS

The accompanying drawings, which are included to provide a further understanding of the invention, illustrate embodiments of the invention and together with the description serve to explain the principle of the invention.

In the drawings:

FIGS. 6A and 6B are lookup tables showing the coefficient setting values of the white region of an input image according to the PSM in accordance with an embodiment of the present invention.

BEST MODE

Additional advantages, objects, and features of the invention will be more readily apparent from consideration of the following detailed description relating to the accompanying drawings. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

Hereinafter, exemplary embodiments of the present invention which can realize the above-described object will be described with reference to the accompanying drawings.

Figure 1:
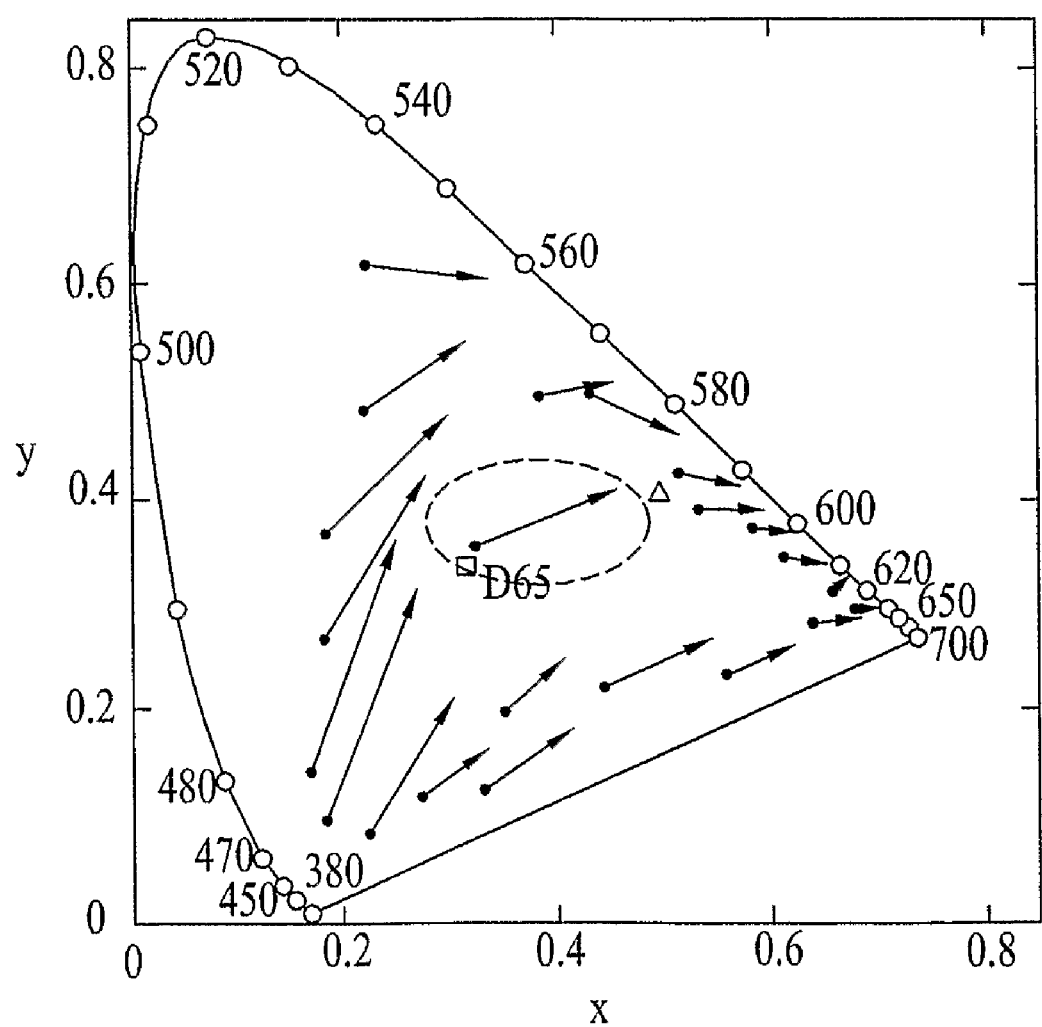
FIG. 1 is a view showing a color shift according to a peripheral light source in a CIE chromaticity diagram.

FIG. 1 is a view showing a color shift according to a peripheral light source in a CIE chromaticity diagram.

A CIE xy coordinate system indicates a standard colorimetric system established by the CIE in 1931. The color temperature of a peripheral light source is detected using the CIE x and y coordinates. In order to enable a color exhibited by a D65 (6500K, 8MPCD) light source of FIG. 1 to be recognized as the same color in a T32 tungsten light source (3200K) by the eyes of a person, the color temperature should be moved in a T32 color temperature axis of the XY coordinate system by an arrow. Since specific colors of a standard light source are mapped to different colors of another light source, a color recognized as the same color by the eyes of the person is called a corresponding color.

Accordingly, if the same white compensation gain is given with respect to various peripheral light sources, the white color of a TV screen is sufficiently changed. If the corresponding color value of the white color is computed or is compensated for by a lookup table by measuring the color temperature of the light source, a user can view the same sharp fresh white color regardless of the light source.

Figure 2:
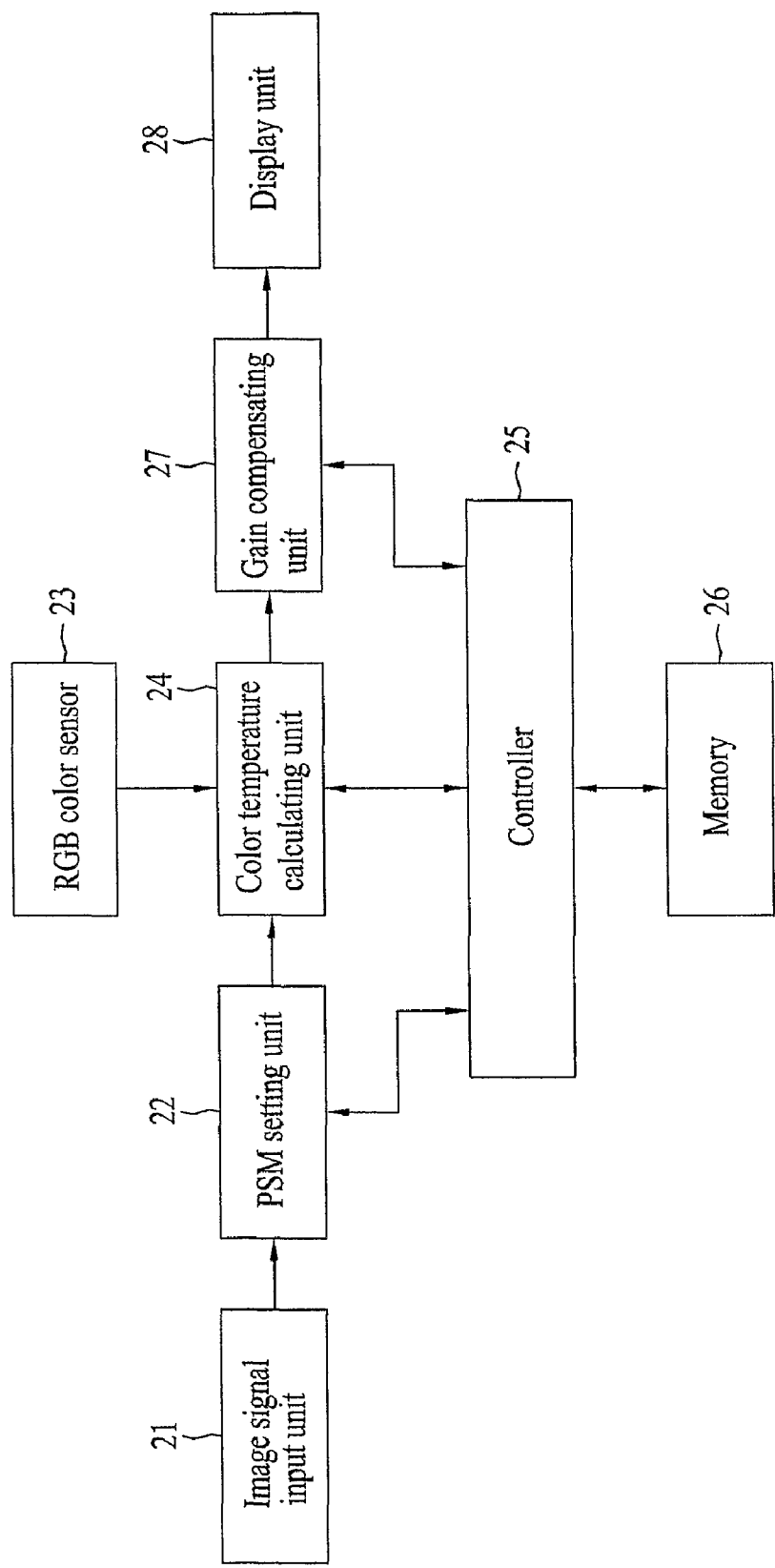
FIG. 2 is a view showing the internal configuration of an image display apparatus for compensating for a white gain of an input image according to a picture status mode (PSM) and a peripheral light source, in accordance with the present invention.

FIG. 2 is a view showing the internal configuration of an image display apparatus for compensating for a white gain of an input image according to a picture status mode (PSM) and a peripheral light source, in accordance with the present invention.

An input signal input unit 21 receives an image signal included in a broadcast signal or an image signal transmitted in a state of being connected to an external image multimedia apparatus.

A PSM setting unit 22 sets the PSM of the image output from the image signal input unit 21 to any one of a comfortable image, a sharp image, a soft image and a user image mode and differently sets values of contrast, brightness and color according to the PSM. At this time, the PSM is set by receiving a signal according to the request of the user via an OSD menu provided on a display screen or is automatically set by detecting the PSM from image information included in an input image signal.

An RGB color sensor 23 measures the light amounts of RGB color signals of an external illuminator. At this time, a white region is detected from an RGB distribution curve for the wavelength of the light and the color temperature of the external light source, which are measured by a color matching function for matching the temperature and the color proportional to the brightness. The RSB color sensor 23 may be readily implemented using a digital camera including a filter having a spectral sensitivity characteristic.

A color temperature calculating unit 24 detects the color temperature of the white balance of the PSM set by the PSM setting unit 22 and calculates a difference between the detected color temperature and the color temperature of the light source measured by the RGB color sensor 23. The color temperature calculating unit 24 detects the color temperature of the white region according to the luminance level of the input image according to the PSM set by the PSM setting unit 22 and calculates the difference between the detected color temperature and the color temperature of the light source measured by the RGB color sensor 23.

A memory 26 stores a lookup table in which color temperature compensation values corresponding to the difference between the color temperature of the light source and the color temperature of the white balance of the PSM are mapped. At this time, the color temperature compensation values are Cb and Cr gain control values of the input image and includes thresholds of a transition section, an application section and a high-luminance section according to the luminance level in the set PSM. The memory 26 stores section setting values of a fade region and a gain region of the luminance level according to the PSM and the color temperature values of the sections in a lookup table.

A controller 25 outputs control signals of the image display apparatus according to the present invention and reads the Cb and Cr gain control values of the RGB color signals of the input image from the memory 26 by the difference between the color temperatures calculated by the color temperature calculating unit 24. The controller 25 sets the RGB color coordinates, in which the gain of the input image is compensated for after the white balance is adjusted, on the basis of a current reference color temperature.

A gain compensating unit 27 outputs a voltage value for compensating for the gains of the RGB signals of the input image on the basis of the Cb and Cr gain control values read from the controller 25 and corrects the color temperature.

A display unit 28 displays an image of which the color temperature is corrected by the gain compensating unit 27.

Figure 3:
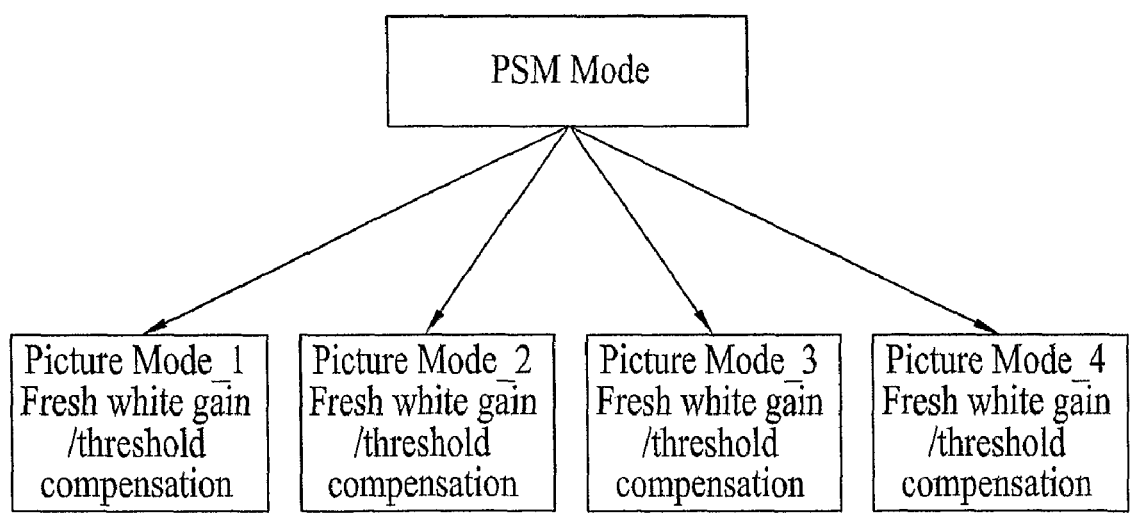
FIG. 3 is a view showing a PSM of an input image in accordance with an embodiment of the present invention.

FIG. 3 is a view showing a PSM of an input image according to an embodiment of the present invention.

According to the embodiment of the present invention, the PSM is divided into Picture mode_1, Picture Mode_2, Picture Mode_3 and User Mode, each of which becomes any one of a comfortable image, a sharp image and a soft image. A color temperature value of the white balance is changed according to the picture modes.

Figure 4:
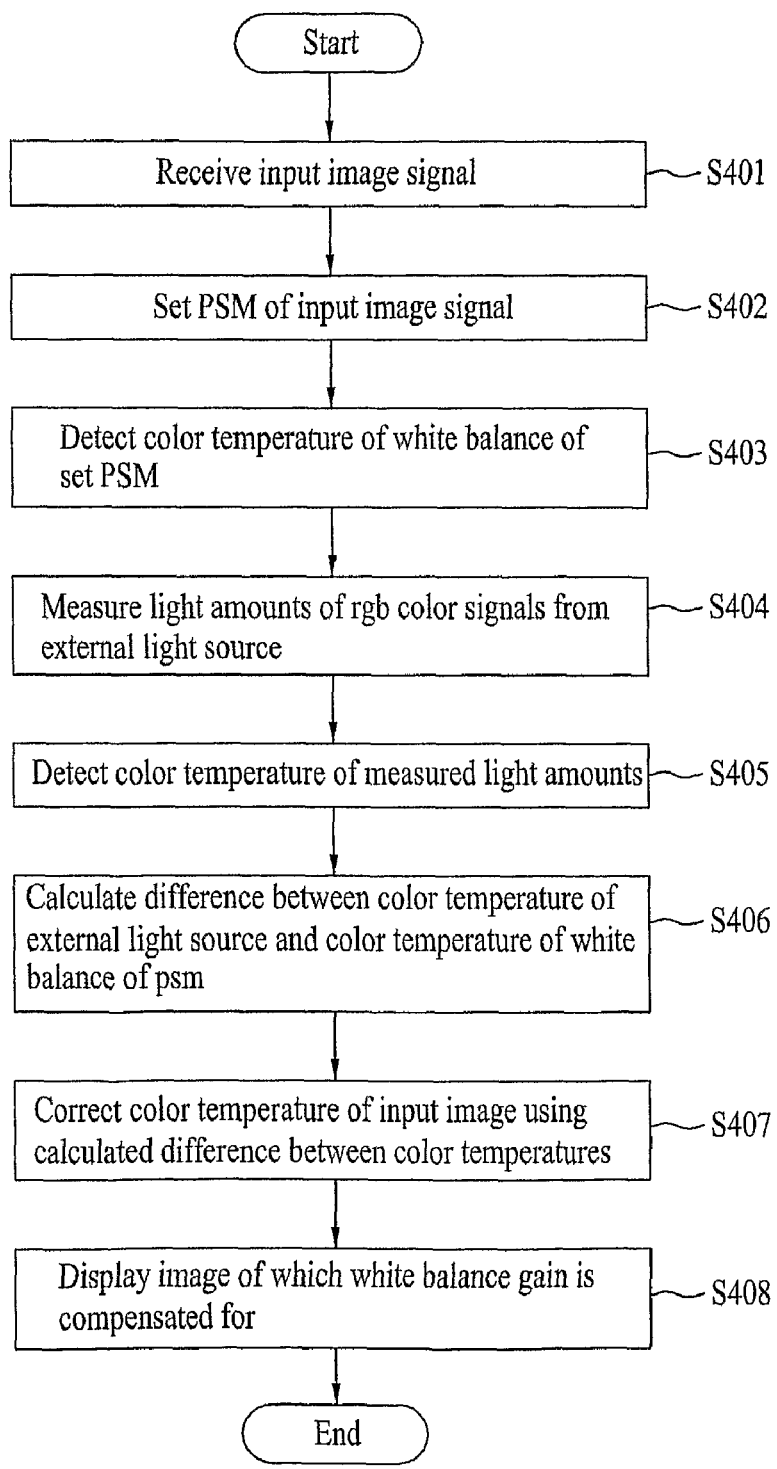
FIG. 4 is a flowchart illustrating a method of compensating for a white gain of an input image according to a PSM and a peripheral light source, in accordance with a first embodiment of the present invention.

FIG. 4 is a flowchart illustrating a method of compensating for a white gain of an input image according to a PSM and a peripheral light source, in accordance with a first embodiment of the present invention.

An input image signal is received from a video card via the image signal inputting unit (S401).

The PSM of the input image is set (S402). According to the embodiment of the present invention, the PSM is any one of a comfortable image, a sharp image and a soft image. In the present invention, the PSM of the input image signal is set by a method of manually setting a PSM by the selection of the user or a method of automatically setting the PSM by image information detected from the received image signal.

The color temperature of the set PSM is detected (S403).

The light amounts of the RGB color signals from the external light source are measured (S404).

The measured color temperature of the external light source is detected (S405). At this time, the color temperature value of the white region is detected from an RGB distribution curve for the wavelength of the light and the light amount of the external light source, which are measured by the color matching function for matching the temperature and the color proportional to the brightness.

The difference between the color temperature of the external light source and the color temperature of the white balance of the PSM of the input image is calculated (S406).

A color temperature compensation value corresponding to the calculated difference between the color temperatures is applied so as to correct the color temperature of the input image (S407).

The image of which the white balance gain is compensated for is displayed (S408).

Figure 5:
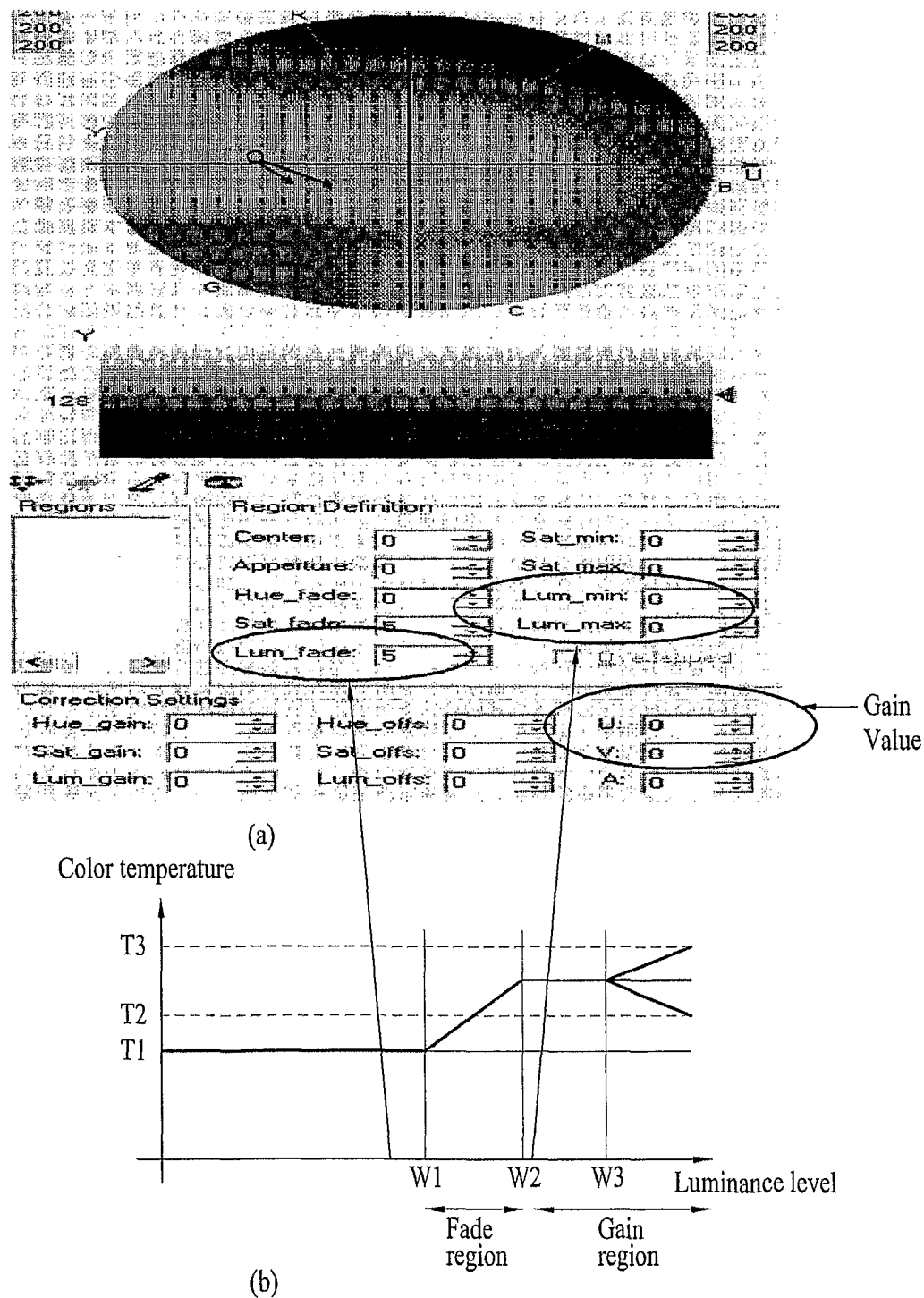
FIGS. 5A and 5B are views showing color temperatures of white regions according to the PSM in accordance with the present invention.

FIGS. 5A and 5B are views showing color temperatures of white regions according to the PSM in accordance with the present invention.

FIG. 5A shows the setting coefficients of the luminance level regions from a UV coordinate plane according to the PSM of the input image in accordance with the present invention. A fade region (Lum_fade), a maximum value (Lum_max) and a minimum value (Lum_min) of luminance are set on the basis of the luminance level and thus a UV gain value is acquired. FIG. 5B shows the color temperatures T1, T2 and T3 corresponding to the regions W1, W2 and W3 according to the luminance level in the set PSM of the input image. The white region according to the luminance level is divided into a fade region (W1 to W2) and a gain region (W2 . . . ). The gain region includes a high-luminance region (W3 . . . ). The color temperature corresponding to the white region according to the luminance level includes a color temperature T1 (11,000) set at the time of the shipment of a product, a color temperature T2 (13,000) for providing a fresh feeling and a color temperature limit T3 (15,000) for providing the fresh feeling. Accordingly, the white region of the luminance level according to the PSM of the input image is divided into the transition section which is the fade region representing the brightness proportional to the color temperature and the high-luminance section which is the gain region having the limit of the color temperature.

FIGS. 6A and 6B show lookup tables showing the coefficient setting values of the white region of an input image according to the PSM in accordance with an embodiment of the present invention.

According to the embodiment of the present invention, each of Picture Mode_1, Picture Mode_2 and Picture Mode_3 of the PSM may be any one of the comfortable image, the sharp image and the soft image. In User Mode, the user adjusts dynamic reference values of luminance regions by a predetermined value.

The coefficients of the luminance regions according to the PSM are set to a minimum value Y_Min of the luminance in an intermediate gray scale, a maximum value Y_Max in the intermediate gray scale, a threshold Y-fade of the luminance in the transition section, a maximum value Saturation_Max of the luminance level of the high-luminance section, a minimum value Saturation_Min of the luminance level of the high-luminance section and a threshold Saturation_fade of the luminance of the fade region in the high-luminance section.

In User Mode, a maximum value Y_Max in the intermediate gray scale, a threshold Y_fade of the luminance in the transition section, and a threshold Saturation_fade of the fade region in the high-luminance section are fixed and the step of the luminance level in the remaining luminance region can be adjusted.

Figure 7:
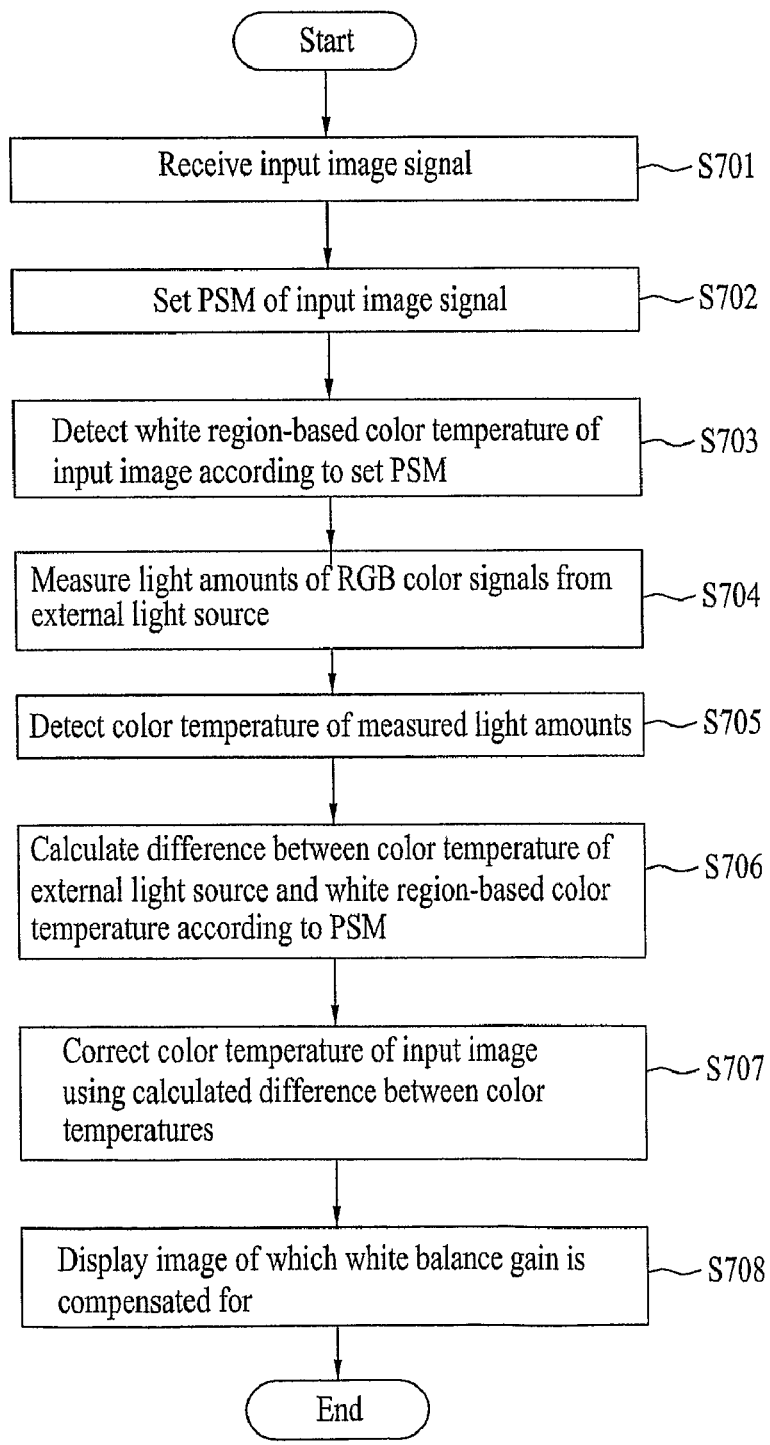
FIG. 7 is a flowchart illustrating a method of compensating for a white gain of an input image according to a PSM and a peripheral light source, in accordance with a second embodiment of the present invention.

FIG. 7 is a flowchart illustrating a method of compensating for a white gain of an input image according to a PSM and a peripheral light source, in accordance with a second embodiment of the present invention.

An input image signal is received from a video card via the image signal inputting unit (S701).

The PSM of the input image signal is set (S702). According to the embodiment of the present invention, the PSM is any one of a comfortable image, a sharp image and a soft image. In the present invention, the PSM of the input image signal is set by a method of manually setting a PSM by the selection of the user or a method of automatically setting the PSM by the image information detected from the received image signal.

The luminance level region-based color temperature of the input image according to the set PSM is detected (S703).

The light amounts of the ROB color signals from the external light source are measured (S704).

The measured color temperature of the external light source is detected (S705). At this time, the color temperature value of the white region is detected from an RGB distribution curve for the wavelength of the light and the light amount of the external light source, which are measured by the color matching function for matching the temperature and the color proportional to the brightness.

The difference between the color temperature of the external light source and the luminance level region-based color temperature of the PSM of the input image is calculated (S706).

A color temperature compensation value corresponding to the calculated difference between the color temperatures is applied so as to correct the color temperature of the input image (S707).

The image of which the white balance gain is compensated for is displayed (S708).

Figure 8:
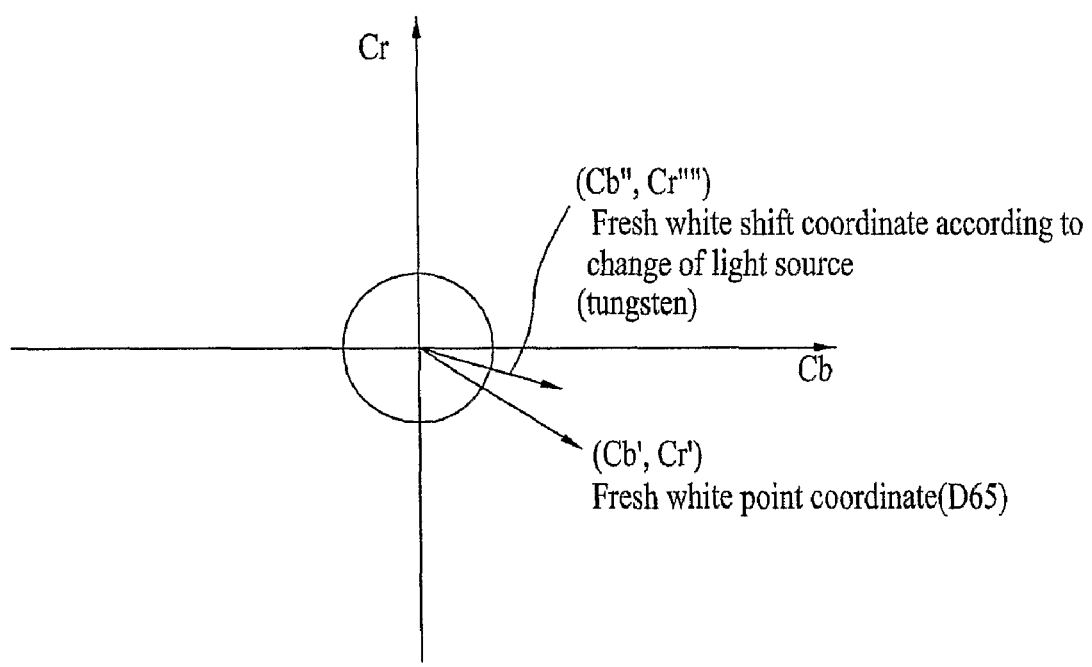
FIG. 8 is a view showing a variation in white gain on a CbCr coordinate system according to the PSM and the peripheral light source in accordance with the present invention.

FIG. 8 is a view showing a variation in white gain on a CbCr coordinate system according to the PSM and the peripheral light source, in accordance with the present invention.

The white balance (Cb'Cr') coordinate system of the input image is moved to the Cb"Cr" white coordinate system by the gain control value for correcting the difference between the color temperature of the external light source and the luminance level region-based color temperature according to the setting of the PSM such that the white compensation of the constant color temperature is performed.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention provides an image display apparatus for compensating for a sharp white color by differently setting a color space reproduced in consideration of the color reproduction characteristic due to a peripheral light source and a brightness level according to a PSM of an input image.

The invention claimed is:

1. A method of compensating for white balance of an image display apparatus, the method comprising:
   reading a picture status mode (PSM) set in the image display apparatus;
   detecting a white region-based color temperature based on a luminance level of an input signal according to the PSM;
   measuring light amounts of RGB color signals from an external light source of the image display apparatus and detecting a color temperature of the external light source;
   calculating a difference between the detected color temperature of the external light source and the white region-based color temperature according to the set PSM;
   correcting the white region-based color temperature of the input image according to the set PSM based on the calculated difference between the color temperatures; and
   displaying an image of which the white region-based color temperature according to the PSM is compensated for.

2. The method according to claim 1, wherein the white region according to the luminance level of the input image is divided into a transition section, an application section and a high-luminance section of the luminance based on the basis of the set PSM.

3. The method according to claim 1, wherein said correcting includes correcting Cb and Cr gain values of the input image.

4. The method according to claim 1, wherein the PSM set in the image display apparatus is at least one of a comfortable image, a sharp image, a soft image, or a user image mode.

5. The method according to claim 4, wherein the PSM is set based on an input signal selected by a user.

6. The method according to claim 4, wherein the PSM is automatically set by image information detected from the input image.

7. The method according to claim 1, further comprising:
   performing white balance gain compensation based on a lookup table in which color temperature compensation values according to the PSM corresponding to the calculated difference between the color temperatures are set.

8. An image display apparatus comprising:
   an image signal input to receive an input image signal;
   a picture status mode (PSM) setter to set a PSM of the received image;
   a RGB color sensor to detect a white region-based color temperature based on a luminance level of the input signal according to the PSM, measure light amounts of RGB color signals from an external light source, and detect a color temperature of the external light source;
   a color temperature calculator to calculate a difference between the detected color temperature of the external light source and the white region-based color temperature according to the set PSM;
   a gain compensator to correct the white region-based color temperature of the input image according to the PSM based on the calculated difference between the color temperatures; and
   a display to display an image of which the white region-based color temperature according to the PSM is compensated for.

9. The image display apparatus according to claim 8, further comprising a memory to store color temperature compensation values according to the PSM corresponding to the calculated difference in a lookup table and color temperatures of sections of a fade region and a gain region of the white balance according to the set PSM in the lookup table.

10. The image display apparatus according to claim 9, wherein the memory further stores a color temperature of a high-luminance section according to the set PSM.

11. The image display apparatus according to claim 9, wherein the memory stores section setting values of the fade region and the gain region of the white balance.

12. The image display apparatus according to claim 9, wherein the color temperature compensation values stored in the memory include thresholds of a transition section, an application section and a high-luminance section of the white balance according to the PSM.

13. The image display apparatus according to claim 8, wherein the RGB color sensor detects the color temperature of the external light source using a color matching function.

14. The image display apparatus according to claim 13, wherein the RGB color sensor includes a digital sensor including a filter having a spectral sensitivity characteristic.

15. The image display apparatus according to claim 8, wherein the PSM setter sets at least one of a comfortable image, a sharp image, a soft image, or a user image mode with respect to the input image.

16. The image display apparatus according to claim 8, wherein the PSM setter sets the PSM based on an input signal selected by a user.

17. The image display apparatus according to claim 8, wherein the PSM setter automatically sets the PSM based on image information detected from the input image signal.

18. The image display apparatus according to claim 8, wherein the white region according to the luminance level of the input image is divided into a transition section, an application section, and a high-luminance section of the luminance based on the set PSM.

* * * * *